G. R. ROSENBERG.
STEERING GEAR FOR MOTOR VEHICLES.
APPLICATION FILED MAR. 13, 1916.
1,204,193.
Patented Nov. 7, 1916.
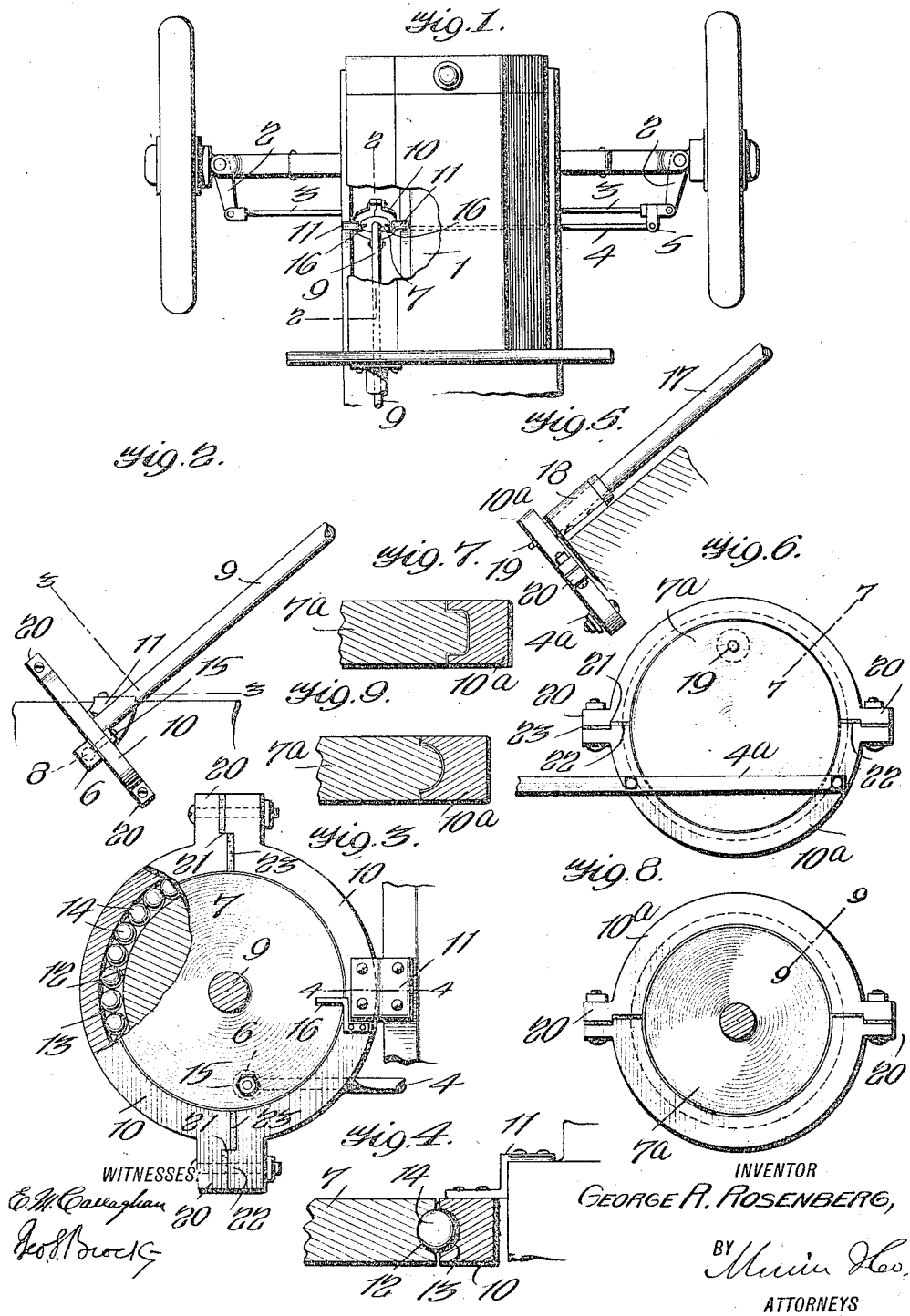
WITNESSES
INVENTOR
GEORGE R. ROSENBERG,
BY
ATTORNEYS

UNITED STATES PATENT OFFICE.

GEORGE R. ROSENBERG, OF WHITE CLOUD, MICHIGAN.

STEERING-GEAR FOR MOTOR-VEHICLES.

1,204,193.   Specification of Letters Patent.   Patented Nov. 7, 1916.

Application filed March 13, 1916. Serial No. 83,912.

*To all whom it may concern:*

Be it known that I, GEORGE R. ROSENBERG, a citizen of the United States, and a resident of White Cloud, in the county of Newaygo and State of Michigan, have invented certain new and useful Improvements in Steering-Gear for Motor-Vehicles, of which the following is a specification.

My invention relates to improvements in steering mechanism for vehicles and more particularly the motor driven type and has for an object to provide a device of the character specified so arranged as to reduce the leverage on the steering post.

Another object is to provide a steering mechanism wherein a greater power may be applied to the steering wheels with a small leverage on the steering post.

A further object is to provide a steering device wherein the percentage of throw of the steering rod may be increased or diminished.

With these and other objects in view my invention consists in certain novel features of construction, arrangement and combination of parts as will be hereinafter described and pointed out in the specification and the scope thereof defined by the claims, reference being had to the accompanying drawings forming a part hereof, in which—

Figure 1 is a top plan view partly broken out to show my invention, Fig. 2 is a sectional view on line 2—2 of Fig. 1, Fig. 3 is a bottom plan view of same, Fig. 4 is a sectional view on line 4—4 of Fig. 3, Fig. 5 is a sectional side elevation of a modification, Fig. 6 is a bottom plan view of the modification, Fig. 7 is a sectional view taken on line 7—7 of Fig. 6, Fig. 8 is a view showing another form of mounting of the crank disk, Fig. 9 is a sectional view on line 9—9 of Fig. 8.

In carrying out my invention I have shown it applied to a Ford automobile, but it is of course obvious that it is susceptible of use with any type of motor driven vehicle.

In Fig. 1 I have shown the usual front axle and steering wheels of this type of vehicle, 1 representing the engine structure broken away to show the connection between the crank disk and the axle arms; the usual drag link 3 is connected to the said arms 2 and the steering rod 4 is connected at one end to the said link by a flexible joint 5 and at the opposite end by a flexible joint 6 to the crank disk 7 by a crank pin 8; the crank disk is rigidly attached to the lower end of the steering post 9 which passes up through the floor of the vehicle and has the usual hand wheel at its upper end; suspended from the frame is an annulus 10 held stationary by brackets 11 secured to the frame, the crank disk being perpendicular to the steering post and the annulus being disposed in the same plane with the disk. The disk 7 has a peripheral semi-circular groove 12 entirely surrounding it and the annulus has a similar groove 13 in its inner edge and in these grooves which together form a circular raceway, a circular series of balls 14 is located the balls coupling the disk with the annulus and rotatably supporting the disk in the said annulus. Projecting from the lower face of the disk is the crank pin 8, which has a rounded head to be secured to one end of the rod 4; the crank pin passes through the disk and is held in place by a nut 15 which will strike one of the stops 16 secured to the annulus 10; the crank pin it will be noticed, projects from the face of the disk intermediate the center and its circumference, and by moving said pin nearer to the center it will be evident that less leverage on the steering post will be necessary.

If desired the ball bearing connection may be omitted and a suitable tongue and groove connection used as shown in Figs. 6 and 7 it being necessary however, that the annulus 10 be stationary and form a support as well as a guide for the rotatable disk.

By using a disk with the pin within the circumference or between the axis and circumference, a greater purchase on the steering rod is secured, that is to say, that slight oscillation only, of the steering post is necessary to secure a wide range of movement of the steering wheels. Thus a greater throw or percentage of throw is obtained in proportion to the distance of the crank pin from the circumference, that is, the less the distance from the center to the pin, the greater the power secured on the steering rod within a given amount of oscillatory movement of the steering post.

It is believed that from the above description the complete operation of the device will be evident. In Figs. 5, 6, 7, 8, and 9 I have shown a modified form of device wherein the disk is eccentrically mounted at the lower end of the steering post 17, being rotatably held in a bearing 18 on the frame and the annulus or strap 10a surrounds said disk 7a holding the same in position, both members being perpendicular to the steering post; in this form the annulus moves with the disk when it is turned by the post and the connecting rod 4a is rigidly secured to the lower face of the annulus and passes across the lower face of the disk, its movement being limited by the stop pin 19 projecting from the post 17 or some other suitable point. It will be seen that by this construction when the disk is turned that the annulus or strap oscillates with it and carrying the rod 4a will swing the wheels through their stub axle connections.

The annulus in either form is to be made in two separable parts to admit the disk and hold it in place and in Figs. 3, 6, and 8 I have shown how this may be done. The upper portion of the annulus has the ears 20 projecting outwardly and they are provided with the cut out portions 21 which receive the lugs 22 on the lower half of the annulus and the mating ears are then bolted together as shown; by this arrangement of the lugs and cut out parts, it will be seen that the halves of the annulus cannot move relatively to each other and that therefore the circular space in which the disk turns will always be true; to take up wear for these parts packing 23 may be applied to or removed from between the ears.

I claim:—

1. The combination with the steering post of a motor vehicle, of a circular disk rigidly secured to the lower end of the post and perpendicular thereto, a crank pin projecting from the lower face of the disk intermediate its axis and its circumference, said disk having an annular peripheral groove, a stationary annulus or cage surrounding said disk and perpendicular to the steering post and having an annular groove in its inner face complementary to the peripheral groove of the disk, a circular series of anti-friction bodies running partly in each of said grooves and rotatably supporting the disk within the annulus, a steering rod having a flexible connection at one end with the crank pin and flexibly connected at its opposite end with the drag link of the steering gear of the vehicle.

2. The combination with the steering post of a motor vehicle comprising a drag link, a circular disk rigidly mounted at the lower end of the steering post and perpendicular thereto, an annulus or cage surrounding the disk in a coincident plane, said disk rotatably held within the annulus, a stop projecting from the face of the disk and means connecting steering post and drag link and controlled by said stop whereby the oscillation of the steering post will change the angularity of the steering wheels of the vehicle through the disk and surrounding annulus and such oscillation be limited by the aforesaid stop.

3. The combination with the steering post of a motor vehicle including a drag link, of a circular disk rigidly secured to the lower end of the post and perpendicular thereto, a crank pin secured to said disk and projecting from the lower face thereof intermediate its axis and circumference, a stationary annulus or cage having a circular opening and surrounding said disk, the periphery of the disk and the annulus having grooved coöperation whereby the annulus supports and permits rotation of the disk, a steering rod having flexible connection at one end, with said crank pin and at its opposite end having flexible connection with the drag link of the steering gear of the vehicle.

4. The combination with the steering post of a motor vehicle comprising a drag link, of a circular disk rigidly secured to the lower end of the post and perpendicular thereto, a crank pin projecting from the lower face of the disk intermediate its axis and circumference, a projection on the upper face of the disk, a stationary annulus surrounding said disk and rotatably supporting the same, a stop on said annulus adapted to coöperate with the projection on the upper face of the disk to limit rotation of the disk, a steering rod having flexible connection at one end with said crank pin and at its opposite end having flexible connection with the drag link of the steering gear of the vehicle.

5. The combination with the steering post of a motor vehicle including a drag link, of a circular disk rigidly secured to the lower end of the post and perpendicular thereto, a crank pin projecting from the lower face of the disk intermediate its axis and circumference, a stationary annulus having a circular opening surrounding said disk and within which said disk is rotatably supported, said annulus consisting of coöperating separable members, means carried by said members and coöperating to prevent relative movement of the same, a steering rod having flexible connection at one end with the crank pin and at its opposite end having flexible connection with the drag link of the steering gear of the vehicle.

6. The herein described steering mechanism for motor vehicles comprising a disk mounted to oscillate on a fixed center, a stop projecting from one face of said disk, an annulus surrounding said disk, a rod mounted for movement across one face of said disk by oscillation of same and contact with the stop to limit oscillation, means for oscillating the disk, the free end of the rod having flexible connection with the drag link of the steering gear of the vehicle.

GEORGE R. ROSENBERG.